United States Patent
Bachmann

(10) Patent No.: US 9,248,745 B1
(45) Date of Patent: Feb. 2, 2016

(54) WHEEL STABILITY CONTROL BASED ON THE MOMENT OF AN ELECTRICAL MOTOR

(71) Applicant: Robert Bosch GmbH, Stuttgart (DE)

(72) Inventor: Markus Bachmann, Loewenstein (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/487,956

(22) Filed: Sep. 16, 2014

(51) Int. Cl.
| | |
|---|---|
| *B60T 13/74* | (2006.01) |
| *B60L 3/10* | (2006.01) |
| *B60L 15/20* | (2006.01) |
| *B60L 3/12* | (2006.01) |
| *B60T 8/1755* | (2006.01) |

(52) U.S. Cl.
CPC . *B60L 3/102* (2013.01); *B60L 3/10* (2013.01); *B60L 3/12* (2013.01); *B60L 15/2036* (2013.01); *B60L 15/20* (2013.01); *B60T 8/1755* (2013.01)

(58) Field of Classification Search
USPC .............. 701/22, 70, 82, 84; 290/48; 475/5
See application file for complete search history.

(56) References Cited

U.S. PATENT DOCUMENTS

| | | | |
|---|---|---|---|
| 6,098,002 A | 8/2000 | Horiguchi et al. | |
| 6,267,189 B1 | 7/2001 | Nielsen et al. | |
| 6,304,809 B1 | 10/2001 | Cullen et al. | |
| 7,340,335 B2 | 3/2008 | Kitaori et al. | |
| 7,529,608 B2 | 5/2009 | Shimizu | |
| 7,742,852 B1 * | 6/2010 | Tang | B60L 3/10 701/22 |
| 7,747,363 B1 * | 6/2010 | Tang | B60L 3/10 701/22 |
| 8,308,248 B2 * | 11/2012 | Jager | B60L 7/26 303/152 |
| 8,453,770 B2 * | 6/2013 | Tang | B60L 15/2036 180/65.1 |
| 8,676,461 B2 | 3/2014 | Nakai et al. | |
| 8,700,241 B2 * | 4/2014 | Yoshimura | B60K 6/445 303/152 |
| 8,761,985 B2 * | 6/2014 | Tang | B60L 15/2036 180/65.1 |

(Continued)

FOREIGN PATENT DOCUMENTS

| | | | |
|---|---|---|---|
| DE | 1020090207941 | 11/2010 | |
| EP | 1752332 A2 * | 2/2007 | ............... B60L 3/10 |

(Continued)

OTHER PUBLICATIONS

Single wheel drives for wheel slip control; Kaspar, S.; Stroph, R.; Pruckner, A.; Hohmann, S.; Electric Vehicle Symposium and Exhibition (EVS27), 2013 World; Year: 2013; pp. 1-7, DOI: 10.1109/EVS.2013.6915038.*

(Continued)

*Primary Examiner* — Cuong H Nguyen
(74) *Attorney, Agent, or Firm* — Michael Best & Friedrich LLP

(57) ABSTRACT

A wheel stability control system for an electric vehicle including an electric motor, a drive inverter, and an electronic control unit (ECU) including a computer readable, non-transitory memory (memory) and an electronic processing unit (EPU). The memory stores information including an optimal acceleration and deceleration curve and the electrical characteristics of the electric motor. The EPU calculates the electrical moment of the electric motor from inputs from the drive inverter and the electrical characteristics of the electric motor. The ECU compares the electrical moment and the angular speed of the motor with the optimal acceleration and deceleration curve, and if the acceleration or deceleration of the electric motor is out of a predetermined range when compared to the optimal acceleration and the optimal deceleration, it reduces the electrical moment applied by the electric motor.

16 Claims, 3 Drawing Sheets

(56) References Cited

U.S. PATENT DOCUMENTS

| | | | | |
|---|---|---|---|---|
| 8,770,328 B2* | 7/2014 | Hilberer | ............... | B60T 7/122 |
| | | | | 180/244 |
| 8,868,271 B2* | 10/2014 | Kim | ............... | B60W 10/113 |
| | | | | 180/65.275 |
| 8,880,261 B2* | 11/2014 | Kobayashi | ............... | B60K 7/0007 |
| | | | | 175/61 |
| 8,903,577 B2* | 12/2014 | Jalbout | ............... | B60K 28/16 |
| | | | | 180/65.285 |
| 2006/0006734 A1* | 1/2006 | Tabata | ............... | B60K 6/445 |
| | | | | 303/3 |
| 2007/0038340 A1* | 2/2007 | Sekiguchi | ............... | B60L 3/10 |
| | | | | 701/22 |

FOREIGN PATENT DOCUMENTS

| | | | | |
|---|---|---|---|---|
| JP | 61-264407 | | 11/1986 | |
| JP | 2004-203945 | * | 7/2004 | ............ B60K 6/445 |
| JP | 4188348 B2 | * | 11/2008 | ............ B60L 3/10 |
| KR | 2007018706 A | * | 2/2007 | ............ B60L 3/10 |
| WO | WO2012/029476 | * | 3/2012 | ............ B60K 7/0007 |

OTHER PUBLICATIONS

Model-Based Range Extension Control System for Electric Vehicles With Front and Rear Driving-Braking Force Distributions Fujimoto, H.; Harada, S.;Industrial Electronics, IEEE Transactions on; Year: 2015, vol. 62, Issue: 5; pp. 3245-3254, DOI: 10.1109/TIE.2015.2402634.*

Driving control architecture for six-in-wheel-driving and skid-steered series hybrid vehicles; Jaewon Nah; Seungjae Yun; Kyongsu Yi; Wongun Kim; Jongbae Kim; Electric Vehicle Symposium and Exhibition (EVS27), 2013 World; Year: 2013; pp. 1-7, DOI: 10.1109/EVS.2013.6914819.*

Electric Braking Control Methods for Electric Vehicles With Independently Driven Front and Rear Wheels; Mutoh, N.; Hayano, Y.; Yahagi, H.; Takita, K.; Industrial Electronics, IEEE Transactions on; Year: 2007, vol. 54, Issue: 2; pp. 1168-1176, DOI: 10.1109/TIE.2007.892731.*

Field and bench test evaluation of range extension control system for electric vehicles based on front and rear driving-braking force distributions; Fujimoto, H.et al.; Power Electronics Conf (IPEC—Hiroshima 2014—ECCE-ASIA), 2014 International;Year: 2014; pp. 1671-1678, DOI: 10.1109/IPEC.2014.6869807.*

* cited by examiner

WHEEL STABILITY CONTROL BASED ON THE MOMENT OF AN ELECTRICAL MOTOR

BACKGROUND

In electric vehicles, as in traditional vehicles, maintaining control over the angular speed of the wheels is critical to maintaining traction with the road surface. A loss of fraction can occur from excessive acceleration or deceleration (i.e. hard braking). When accelerating, the wheels can receive excessive torque from the electric motor. This causes a loss of traction with the road surface and wheel spin. Similarly, when the wheels receive excessive braking force, the wheels lose traction with the road surface. Modern vehicle systems strive to eliminate a loss of traction and wheel spin with wheel stability control systems. These systems include, for example, antilock braking, traction control, and stability control.

Wheel stability control systems are limited in effectiveness by the ability of the vehicle's sensors to determine the vehicle's behavior. In some situations, the vehicle's sensors provide inaccurate or misleading information about the vehicle's behavior. This situation can arise even when the sensors are performing their function correctly and accurately. For example, a wheel angular speed sensor may be correctly detecting the wheel's angular speed, but if the wheel is not maintaining traction with the road surface, the information inaccurately describes the vehicle's speed. Inaccurate information about the vehicle can cause the wheel stability control systems to underperform. Therefore, systems and methods for gathering accurate information about a vehicle and using this information in modern control systems are highly desired.

SUMMARY

In one embodiment, the invention provides a wheel stability control system for optimizing the acceleration and deceleration of an electric vehicle while maintaining wheel stability. A power system including an electric motor and a drive inverter determines the angular speed, the input current, the input voltage, and a phase angle between the input current and the input voltage for the electric motor. An electronic control unit (ECU) calculates an electrical moment of the electric motor by using the input current, the input voltage, the phase angle, and in some embodiments, the electrical characteristics of the electric motor. The electrical moment of the electric motor is the mechanical torque on the electric motor that is created by the active power delivered to the electric motor. Additional mechanical torque is applied by the hydraulic braking system.

The motor's angular speed is directly related to the wheel's angular speed, and thus, with a simple calculation, the motor's angular speed can provide an accurate value of the wheel's angular speed. In normal driving conditions (i.e. very low tire slip), the electronic control unit can determine the speed of the vehicle (i.e. the tangential speed of the wheels) from the angular speed of the motor's angular speed. Therefore, the motor's angular speed provides a way to determine the vehicle's speed without a wheel angular speed sensor. Additionally, the motor's acceleration is determined from the motor's angular speed.

The electronic control unit is preloaded with information about the vehicle's performance. The vehicle's performance can be determined by testing, which can reveal the optimal acceleration and deceleration values for that vehicle type. The optimal acceleration and deceleration values can be plotted on a curve and preloaded into the electronic control unit. Based on the optimal values, the electronic control unit determines an optimal acceleration or deceleration for the electric motor for the motor's current angular speed. The ECU compares the optimal acceleration or deceleration for the electric motor to the calculated acceleration or deceleration for the electric motor. The ECU adjusts the active power to the electric motor by adjusting the input current or input voltage so that the electrical moment is varied, thus varying the motor's acceleration or deceleration. The ECU matches the motor's acceleration and deceleration with the optimal acceleration or deceleration to achieve high performance while maintaining safety.

In another embodiment, the invention provides a method of controlling wheel stability of an electric vehicle including determining electrical characteristics, an input current, an input voltage, a phase angle between the input voltage and the input current, and an angular speed of the electric motor. The information is stored in the ECU, and the ECU calculates an electrical moment of the electric motor based on the input current, the input voltage, the phase angle, the angular speed, and in some embodiments, the electrical characteristics of the electric motor. The acceleration or deceleration of the electric motor is calculated based on the angular speed of the electric motor. Optimal values for acceleration and deceleration are compared to the actual acceleration and deceleration, and when the optimal values are exceeded, the electrical moment is adjusted to bring the actual acceleration and deceleration to the optimal acceleration and deceleration values.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
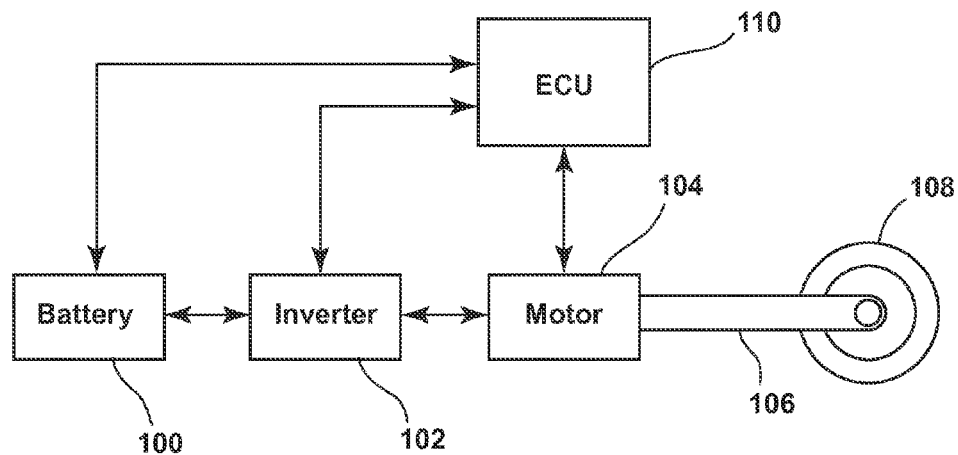
FIG. 1 illustrates a power system for an electric vehicle.

FIG. 1 illustrates an embodiment of a drive system for an electric vehicle. A battery 100 is electrically coupled to a drive inverter 102, which is electrically coupled to an electric motor 104. The electric motor 104 includes a motor shaft 106, which is mechanically coupled to a drive wheel 108. An electronic control unit 110 (ECU) is connected to the battery 100, the drive inverter 102, and the electric motor 104. In some embodiments, the motor shaft 106 is also a drive shaft, and in other embodiments, the motor shaft 106 is coupled to a drive shaft through gearing. In FIG. 1, the motor shaft 106 is coupled to a drive wheel 108. The electric motor 104 can be any type of electrical motor that has sufficient horsepower to drive the vehicle, including, for example, a synchronous motor. A power system of the vehicle includes the drive inverter 102 and the electric motor 104. The power system communicates with the ECU 110 and provides information about the electric motor's 104 input current, input voltage, phase angle between the input current and the input voltage, angular speed, and in some embodiments, the active power.

During acceleration, the battery 100 provides power to the drive inverter 102 by supplying the drive inverter 102 with direct current (DC). The drive inverter 102 converts DC into alternating current (AC) for use in the electric motor 104. The electric motor 104 converts electric power into mechanical power by driving the motor shaft 106. The ECU 110 communicates with the drive inverter 102 and the battery 100 to manage the power delivery to and from the electric motor 104. During braking, the ECU 110 controls the power conversion process from the vehicle's momentum to the battery 100. The braking system 216 decelerates the vehicle both through an electrical moment provided by the electric motor 104, and by hydraulic braking. Preferably, the electric motor 104 provides most or all of the braking moment, because the electric motor 104 and drive inverter 102 recapture some of the vehicle's momentum and convert it back into electrical energy for storage in the battery 100.

Figure 2:
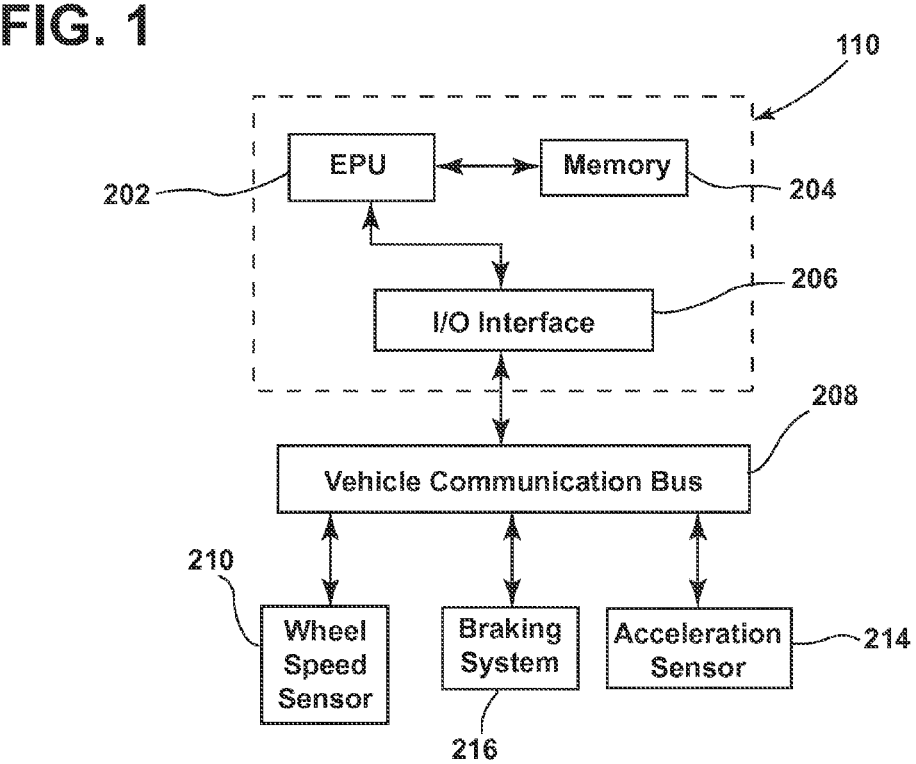
FIG. 2 illustrates an electronic control unit and communication system.

FIG. 2 illustrates a control and communication system for an electric vehicle. The ECU 110 includes an electronic processing unit 202 (EPU), a computer readable, non-transitory memory 204 (memory), and an input/output interface 206. The ECU 110 can comprise multiple and separate components including, for example, a vehicle stability module, an engine control module, a drive control module, and a domain control unit. The memory 204 stores information and programs for use by the electronic processing unit 202. The electronic processing unit 202 is connected to the memory 204 and the input/output interface 206. The input/output interface 206 sends and receives data from the vehicle's sensors. The data is transmitted on a vehicle communication bus 208 (e.g. a CAN bus or a FlexRay bus) or can be communicated through a direct connection to the ECU 110. In some embodiments, a wheel angular speed sensor 210 and a vehicle acceleration sensor 214 provide the ECU 110 with information about the vehicle. The ECU 110 is also connected to the braking system 216. Other information such as the input current, the input voltage, and the angular speed of the electric motor 104 are sent directly to the ECU 110 by the drive inverter 102. The embodiment in FIG. 1 is free from a wheel angular speed sensor 210, because the angular speed of the drive wheel 108 is calculated from the angular speed of the electric motor 104. However, the wheel angular speed sensor 210 is useful in embodiments where one electric motor 104 powers multiple drive wheels. The vehicle acceleration sensor 214 measures the acceleration of the vehicle in the longitudinal direction of travel (i.e., the ax direction). A road inclination is determined using the vehicle acceleration sensor 214 by determining the acceleration due to the road inclination. The road inclination can also be determined by using other sensors and methods.

The memory 204 contains information about the electrical characteristics of the electric motor 104, which the electronic processing unit 202 uses to calculate the electrical moment from the signals from the drive inverter 102. The electrical moment can be estimated for an asynchronous motor as follows:

$$\text{Electrical Moment} \approx C * \frac{P_{electric}}{n}$$

In this equation, C represents the motor specific constant, $P_{electric}$ represents the active power, and n represents the angular speed of the motor. For a three-phase synchronous motor, the electrical moment can be calculated as follows:

$$\text{Electrical moment} \approx P_{electric}$$

$$P_{electric} = \sqrt{3} * U * I * \cos\phi$$

In these equations, $P_{electric}$ represents the active power to the electric motor 104, U is the voltage of the electric motor 104, I is the current of the electric motor 104, $\phi$ is the angle between U and I, and f is the frequency of the electric motor 104. The ECU 110 calculates the electrical moment by using the equations shown above. Additionally, the ECU 110 determines the acceleration or deceleration of the electric motor 104 from the electrical moment and the angular speed of the electric motor 104 by calculating the derivative of the angular speed. The ECU 110 can increase the accuracy of these calculations by including additional terms to compensate for nonlinear effects (e.g., thermal effects or friction).

Figure 3:
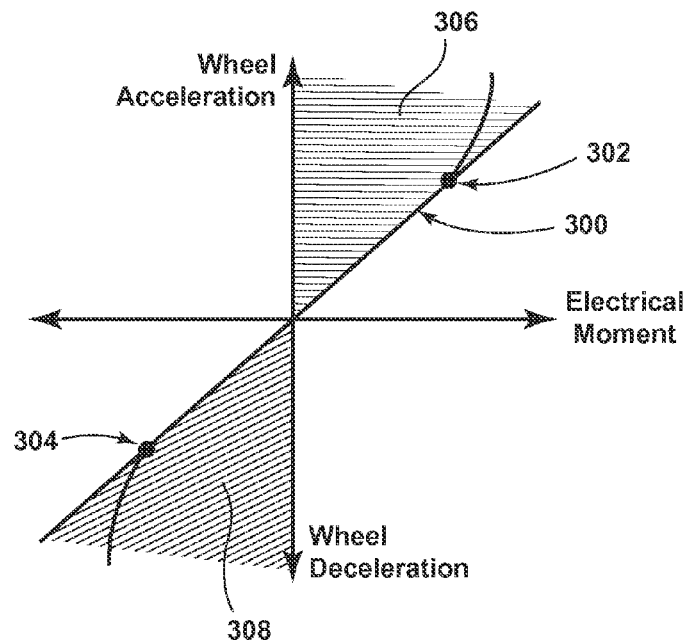
FIG. 3 is a graph that illustrates an optimal acceleration and deceleration curve.

The memory 204 also contains information about the optimal acceleration and deceleration curve 300 for the vehicle as shown in FIG. 3. The ECU 110 uses the optimal acceleration and deceleration curve 300 to compare the electrical moment and the angular speed of the electric motor 104 to the optimal values, and the ECU 110 adjusts the drive inverter 102 and the electric motor 104 to match the optimal acceleration and deceleration curve 300.

The optimal acceleration and deceleration curve 300 shown in FIG. 3 allows for calculation of optimal acceleration and deceleration based on a predetermined range. Each type of vehicle has a maximum acceleration and deceleration depending on the vehicles characteristics (e.g. weight, horsepower, brakes, and tires). The optimal acceleration and deceleration curve 300 depicts the maximum reliable acceleration and deceleration for a given vehicle and for a given value of an optimal slip. The graph in FIG. 3 illustrates the acceleration curve and the deceleration curve on the same line; however, these curves can be distinct and used independently. The horizontal axis represents an electrical moment applied by the electric motor 104 as described above. The electrical moment is positive and increases in strength towards the right. On the left side of FIG. 3, the electrical moment is applied in the opposite direction and increases in strength toward the left. The left side illustrates an electrical moment for braking. The vertical axis on the graph represents acceleration of the drive wheel 108 in the forward direction. As the electric motor 104 increases the electrical moment on the electric motor 104, the acceleration and the speed of the drive wheel 108 increases. If the electric motor 104 creates acceleration of the electric motor 104 greater than the optimal acceleration, the drive wheel 108 will lose traction and increase the tire slip. This is shown by the upper breakaway point 302. The curved portion of the line that extends from the upper breakaway point 302 represents increasing slip of the drive wheel 108 as the electrical moment increases. The upper breakaway point 302 can occur anywhere along the acceleration curve. If the vehicle hits the upper breakaway point 302 and thereby enters the upper area of instability 306, the vehicle becomes unstable. Conversely, the area below the optimal acceleration curve represents typical driving situations where maximum acceleration is not needed.

During braking, if the electric motor 104 creates an electrical moment greater than the optimal deceleration, the drive wheel 108 will lose traction and slip. This is shown by the lower breakaway point 304. The curved portion of the line that extends from the lower breakaway point 304 represents increasing slip of the drive wheel 108 as the electrical moment increases in strength. The lower breakaway point 304 can occur anywhere along the deceleration curve. If the vehicle hits the lower breakaway point 304 and thereby enters the lower area of instability 308, the vehicle becomes unstable. This occurs when an excessive braking moment is applied. The area above the optimal deceleration curve depicts a region of slower deceleration of a drive wheel 108 and thus, normal braking.

The actual acceleration and deceleration of an electric vehicle are controlled by the electrical moment and the angular speed delivered by the electric motor 104. As stated above, excessive electrical moment causes a loss of traction with the road surface. During operation of the vehicle, the upper breakaway point 302 and the lower breakaway point 304 are prevented from occurring by the ECU 110. The ECU 110 limits the electric motor 104 to acceleration of the drive wheel 108 just below the acceleration represented by the upper breakaway point 302. Similarly, the ECU 110 limits the electric motor 104 to deceleration of the drive wheel 108 to just below the deceleration represented by the lower breakaway point 304. This achieves high performance acceleration and deceleration while maintaining good traction with the road surface.

The optimal acceleration and deceleration curve 300 is stored in the memory 204 of the ECU 110. The optimal acceleration and deceleration curve 300 can be preloaded into the ECU 110 before delivery of the vehicle to customers. As described above, the ECU 110 uses the optimal acceleration and deceleration curve 300 to control the stability of the vehicle. The ECU 110 accomplishes this by comparing the angular speed of the electric motor 104 to an optimal angular speed based on the optimal acceleration and deceleration curve 300. When accelerating, if the angular speed of the electric motor 104 is greater than the optimal angular speed as calculated by the electronic processing unit 202, the ECU 110 reduces power to the electric motor 104. When decelerating, if the angular speed of the electric motor 104 is less than the optimal angular speed, the ECU 110 reduces the electrical moment for braking that is generated by the electric motor 104. The ECU 110 performs this process continuously as the vehicle is in motion. This allows the ECU 110 to closely match the angular speed of the electric motor 104 to the optimal angular speed as determined by the optimal acceleration and deceleration curve 300.

Figure 4:
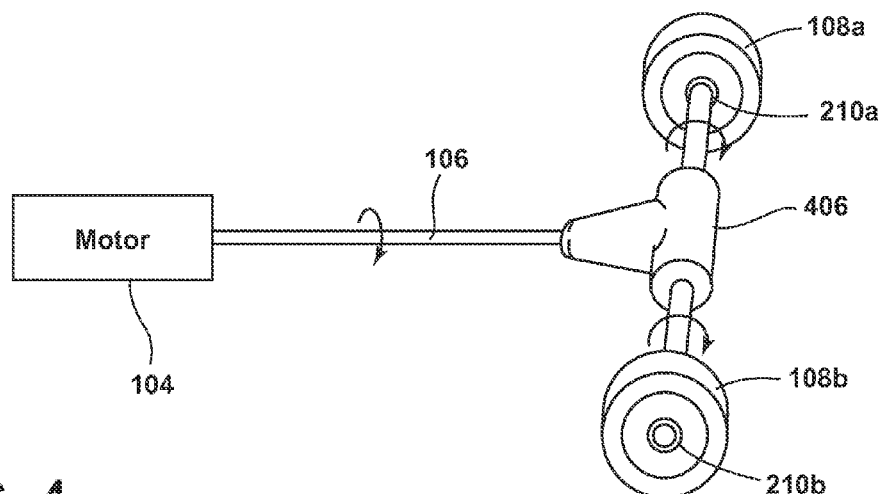
FIG. 4 illustrates an embodiment containing a differential and two drive wheels.

FIG. 4 illustrates an embodiment with drive wheels 108a and 108b. In this embodiment, the motor shaft 106 couples to a differential 406. The differential 406 transmits power to the drive wheels 108a and 108b, which allows the drive wheels 108a and 108b to have different angular speeds. This embodiment includes a plurality of wheel angular speed sensors 210a and 210b, located proximal to each drive wheel, which measure the angular speed of each of the drive wheels 108a and 108b. The angular speed of each of the drive wheels 108a and 108b is transmitted to the ECU 110, which compares the angular speed of each of the drive wheels 108a and 108b with the optimal angular speed of the electric motor 104. Since the differential 406 applies the electrical moment and the angular speed of the electric motor 104 in known ratios, the ECU 110 determines a range of speeds for the drive wheels 108a and 108b. Based on the measured angular speeds of the drive wheels 108a and 108b, the ECU 110 determines the tire slip of the drive wheels 108a and 108b. The ECU 110 uses the tire slip in performing the electronic stability control as described herein. Other embodiments include drive wheels 108a and 108b that are independently driven by multiple electric motors.

Figure 5A:
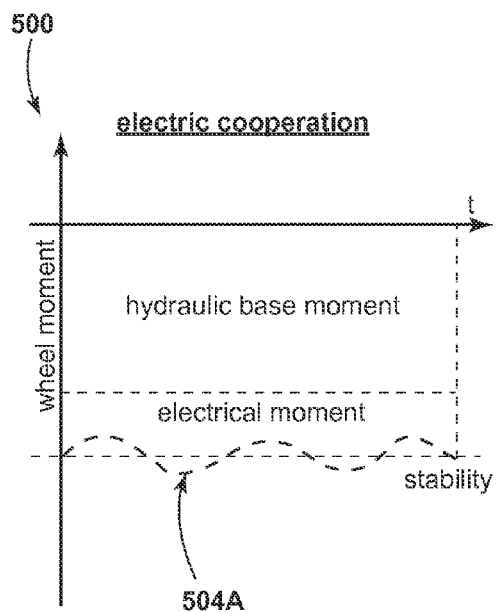
FIGS. 5A and 5B illustrate an electrical moment over time for two different braking configurations.
Figure 5B:
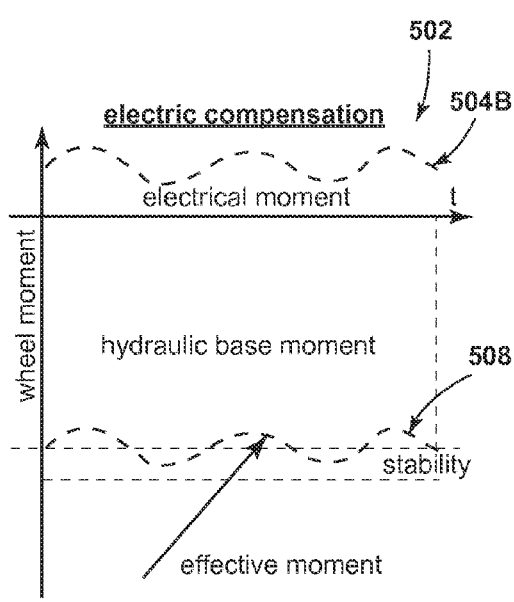

FIGS. 5A and 5B are illustrations of the application of the electronic stability control during deceleration. On the vertical axis, the moment on the drive wheel 108 from the braking system 216 is shown. Time is shown on the horizontal axis. FIG. 5A illustrates an electric cooperation braking mode 500. This is a mode where the hydraulic brakes and the electric motor 104 work in cooperation to slow the vehicle. FIG. 5A demonstrates the effect of the invention for electric cooperation braking mode 500 at optimal deceleration. The ECU 110 applies a modulating electrical moment 504A as the angular speed of the electric motor 104 approaches and meets the optimal angular speed as determined by the optimal deceleration curve. FIG. 5B illustrates an electric compensation braking mode 502. In this mode, the ECU 110 applies a modulating electrical moment 504B to compensate for a disproportionate hydraulic brake torque. The modulating electrical moment 504B is illustrated as maintaining an effective electrical moment 508 of the electric motor 104 just within the stability region.

Thus, the invention provides, among other things, a wheel stability control system for controlling the stability of a vehicle based on an optimal acceleration and deceleration curve 300 and a determination of an electrical moment of an electric motor 104. Various features and advantages of the invention are set forth in the following claims.

What is claimed is:

1. A wheel stability control system for an electric vehicle, the system comprising:
    a power system comprising an electric motor having electrical characteristics, the power system configured to determine an angular speed, an input current, an input voltage, and a phase angle between the input current and the input voltage to the electric motor;
    an electronic control unit (ECU) including a computer readable, non-transitory memory, the memory storing information including an optimal acceleration and deceleration curve of the vehicle and the electrical characteristics of the electric motor, and an electronic processing unit (EPU), wherein the ECU is configured to:
        calculate an electrical moment of the electric motor based on the angular speed, the input current, the input voltage, and the phase angle of the electric motor provided by the power system and on the electrical characteristics of the electric motor,
        determine the acceleration or deceleration of the electric motor from the angular speed of the electric motor,
        calculate the optimal acceleration and the optimal deceleration of the electric motor based on the angular speed of the electric motor and based on the optimal acceleration and deceleration curve,
        determine if the acceleration or the deceleration of the electric motor exceeds the optimal acceleration or the optimal deceleration of the electric motor, and
        when the acceleration or the deceleration of the electric motor exceeds the optimal acceleration or the optimal deceleration, reduce the electrical moment of the electric motor until the acceleration or the deceleration of the electric motor matches the optimal acceleration or the optimal deceleration.

2. The system of claim 1, wherein the ECU configured to determine if the acceleration or the deceleration of the electric motor exceeds the optimal acceleration or the optimal deceleration of the electric motor further comprises configuring the ECU to:
- determine whether the angular speed of the electric motor exceeds a predetermined range when accelerating, wherein an optimal acceleration curve determines the predetermined range, and
- determine whether the angular speed of the electric motor is below a predetermined range when decelerating, wherein an optimal deceleration curve determines the predetermined range.

3. The system of claim 1, wherein the wheel stability control system is free from a wheel angular speed sensor.

4. The system of claim 1, further comprising an acceleration sensor that determines an acceleration of the vehicle and provides a value of the acceleration of the vehicle to the ECU, wherein the ECU adjusts the optimal acceleration and deceleration curve in response to the information from the acceleration sensor.

5. The system of claim 1, wherein the electric motor comprises a synchronous motor.

6. The system of claim 1, wherein the optimal acceleration and deceleration curves are determined and preloaded into the memory prior to delivery of the vehicle to a customer.

7. The system of claim 1, further comprising a second electric motor, wherein the electric motor is coupled to and powers a first drive wheel and the second electric motor is coupled to and powers a second drive wheel.

8. The system of claim 1, further comprising:
- a differential, wherein the differential transmits power from the electric motor to a first drive wheel and to a second drive wheel; and
- a first wheel angular speed sensor located proximal to the first drive wheel and a second wheel angular speed sensor located proximal to the second drive wheel, wherein the first wheel angular speed sensor and the second wheel angular speed sensor transmit information to the ECU, and wherein the ECU determines a tire slip of the first drive wheel and the second drive wheel based on the first wheel angular speed sensor and the second wheel angular speed sensor.

9. The system of claim 1, wherein the power system includes a drive inverter configured to determine the angular speed, the input current, the input voltage, and the phase angle between the input current and the input voltage to the electric motor.

10. A method for controlling drive wheel stability in a vehicle powered by an electric motor, the method comprising:
- determining electrical characteristics of the electric motor;
- determining an input current, an input voltage, a phase angle between the input voltage and the input current, and an angular speed of the electric motor; and
- storing information about the input current, the input voltage, the phase angle, the angular speed, and the electrical characteristics of the electric motor into a computer readable, non-transitory memory for use by an electronic control unit (ECU) to
  - calculate an electrical moment of the electric motor based on the input current, the input voltage, the phase angle, the angular speed, and the electrical characteristics of the electric motor,
  - calculate an acceleration or a deceleration of the electric motor based on the angular speed of the electric motor,
  - determine an optimal acceleration or optimal deceleration of the electric motor based on an optimal acceleration and deceleration curve and the angular speed of the electric motor,
  - compare the acceleration or deceleration of the electric motor to the optimal acceleration or optimal deceleration, and
  - when the acceleration or the deceleration of the electric motor exceeds the optimal acceleration or the optimal deceleration, adjust the electrical moment of the electric motor to bring the acceleration or the deceleration to the optimal acceleration or the optimal deceleration.

11. The method of claim 10, further comprising:
- determining whether the angular speed of the electric motor exceeds a predetermined range when accelerating, wherein an optimal acceleration curve determines the predetermined range, and
- determining whether the angular speed of the electric motor is below a predetermined range when decelerating, wherein an optimal deceleration curve determines the predetermined range.

12. The method of claim 10, wherein the method is free from a wheel angular speed sensor.

13. The method of claim 10, further comprising the steps of:
- determining an acceleration of the vehicle by using a vehicle acceleration sensor and
- transmitting information from the vehicle acceleration sensor to the ECU, wherein the ECU adjusts the optimal acceleration and deceleration curve in response to the vehicle acceleration sensor.

14. The method of claim 10, wherein the electric motor is a synchronous motor.

15. The method of claim 10, wherein the optimal acceleration and deceleration curve is determined and preloaded into a computer readable, non-transitory memory prior to delivery of the vehicle to a customer.

16. The method of claim 10, further comprising:
- transferring power from the electric motor via a differential to two drive wheels;
- determining an angular speed for each of the two drive wheels by using a wheel angular speed sensor located proximal to each of the two drive wheels; and
- transmitting information from each wheel angular speed sensor to the ECU, wherein the ECU determines a tire slip of each of the two drive wheels.

* * * * *